United States Patent
Dong (10) Patent No.: US 12,511,056 B2
(45) Date of Patent: Dec. 30, 2025

(54) PERFORMING WRITE OPERATIONS AT INCREASED WRITE SPEEDS BASED ON POTENTIAL EVENTS

(71) Applicant: Micron Technology, Inc., Boise, ID (US)

(72) Inventor: Qi Dong, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/658,445

(22) Filed: May 8, 2024

(65) Prior Publication Data

US 2024/0377965 A1    Nov. 14, 2024

(30) Foreign Application Priority Data

May 9, 2023    (CN) .......................... 202310513290.9

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0659; G06F 3/0679; G06F 3/0619
See application file for complete search history.

(56) References Cited

U.S. PATENT DOCUMENTS

| | | | |
|---|---|---|---|
| 9,996,291 B1 * | 6/2018 | Izhar | G06F 11/1441 |
| 2009/0249087 A1 * | 10/2009 | Wakrat | G06F 1/30 |
| | | | 713/300 |
| 2015/0002674 A1 * | 1/2015 | Kleve | H04N 7/18 |
| | | | 348/149 |
| 2015/0127886 A1 * | 5/2015 | Kanno | G06F 12/0246 |
| | | | 711/103 |
| 2021/0350861 A1 * | 11/2021 | Nam | G11C 11/4074 |
| 2022/0137823 A1 * | 5/2022 | Shabi | G06F 3/061 |
| | | | 711/154 |

* cited by examiner

*Primary Examiner* — Jane W Benner
(74) *Attorney, Agent, or Firm* — Harrity & Harrity, LLP (57) ABSTRACT

In some implementations, a memory device may receive, from a host device, a signal indicative of a potential event. The memory device may pause, based on the signal, a background operation of the memory device. The memory device may perform a write operation to write data to the memory while the background operation is paused, wherein a write speed associated with the write operation is an increased write speed, as compared to a default write speed, based on the background operation being paused during the write operation.

20 Claims, 5 Drawing Sheets

PERFORMING WRITE OPERATIONS AT INCREASED WRITE SPEEDS BASED ON POTENTIAL EVENTS

CROSS-REFERENCE TO RELATED APPLICATION

This patent application claims priority to China Patent Application No. 202310513290.9, filed on May 9, 2023, entitled "PERFORMING WRITE OPERATIONS AT INCREASED WRITE SPEEDS BASED ON POTENTIAL EVENTS," and assigned to the assignee hereof. The disclosure of the prior application is considered part of and is incorporated by reference into this patent application.

TECHNICAL FIELD

The present disclosure generally relates to memory devices, memory device operations, and, for example, to performing write operations at increased write speeds based on potential events.

BACKGROUND

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

DETAILED DESCRIPTION

A vehicle digital video recorder (DVR) system, such as a dashboard camera or an event data recorder, may be an onboard camera (e.g., a vehicle-mounted camera) that continuously records one or more views associated with a vehicle. The one or views may include exterior views of the vehicle, such as a front view, a rear view, and/or one or more side views. The one or more views may include interior views of the vehicle, such as a view of front passengers and/or back passengers in the vehicle. The vehicle DVR system may capture various types of information associated with the vehicle. For example, the vehicle DVR system may capture audio and/or video (audio/video) information associated with the one or more views. The vehicle DVR system may also capture acceleration data, speed data, positioning data, and/or other types of information associated with the vehicle. The vehicle DVR system may capture information associated with the vehicle when the vehicle is moving and/or when the vehicle is stationary or turned off (e.g., paused at a red light or parked).

The vehicle DVR system may provide captured information (e.g., audio/video information and/or image information) as evidence related to an event associated with the vehicle. The event may include a road accident or vandalism (e.g., when the vehicle is parked). The vehicle DVR system may serve as an accurate eyewitness and provide reliable evidence associated with the event, which may help to resolve questions regarding which party is at fault for causing the event to happen.

In some cases, the vehicle DVR system may lose power based on the event. For example, a power supply associated with the vehicle DVR system may be damaged during a road accident, and power may no longer be provided to the vehicle DVR system, thereby causing an operation of the vehicle DVR system to be terminated. Some information (e.g., audio/video information) captured by the vehicle DVR system may not be successfully stored onto a memory of the vehicle DVR system before the vehicle DVR system is terminated. For example, a last few seconds of captured video data may not be completely saved during vehicle crashes, especially when the power supply of the vehicle DVR system is affected. The vehicle DVR system may capture the information and the captured information may be buffered into volatile memory (e.g., a dynamic random-access memory (DRAM) buffer), but a subsequent power loss may prevent the captured information buffered in the volatile memory from being written into a non-volatile memory. Captured information buffered in the volatile memory that is not written into the non-volatile memory before the power loss occurs may be permanently lost, thereby degrading an overall performance of the vehicle DVR system.

A power loss protection circuit, which may be a charge circuit with a capacitor, may provide additional power to the vehicle DVR system after the power supply is affected by the event. However, a power maintaining time associated with the power loss protection circuit may not be sufficient to save high definition (HD) video, ultra-high definition (UHD) video, or footage files from multi-channel camera sensors. The captured information ready in the DRAM buffer may not be successfully flushed into the non-volatile memory before the power loss occurs, even with the power loss protection circuit, and thus the captured information may be permanently lost. The captured information may be crucial to resolve issues associated with the event, and losing such captured information may be unfavorable. Further, the power loss protection circuit may result in additional cost.

In some implementations described herein, a vehicle DVR system may include a host device and a memory device. The host device and the memory device may be associated with a vehicle. The host device may obtain video data, which may be captured via a camera sensor associated with the vehicle. The host device may collect information from one or more sensors (e.g., a motion sensor or a proximity sensor) associated with the vehicle. The information may include objective movement information associated with objects outside of the vehicle, speed information associated with the vehicle, and/or position information associated with the vehicle. The host device may detect a potential event (e.g., a traffic accident) based on the sensor information. For example, the host device may detect the potential event based on objective movement information indicating that an object is moving toward the vehicle at a relatively high velocity. The host device may transmit, to the memory device, a signal indicative of the potential event. The memory device may receive the signal from the host device. The memory device may pause, based on the signal, a background operation (or multiple background operations) associated with the memory device. The background operation may be a defragmentation operation, a refresh scan operation, and/or a single-level cell (SLC) to triple-level cell (TLC) folding operation. The memory device may perform a write operation to write the video data to memory while the background operation is paused. A write speed associated with the write operation may be an increased write speed, as compared to a default write speed (e.g., which may occur when the background operation is not paused), based on the background operation being paused during the write operation. The default write speed may include a range of default write speeds, which may occur when the background operation is not paused. As a result, the video data is more likely to be successfully written to the memory before an occurrence of an event (e.g., the traffic accident), which may terminate power to the vehicle DVR system and cause the video data to be lost.

In some implementations, the memory device may successfully write recently captured video data (e.g., a last few seconds of recorded video data) to the memory before the occurrence of the event. The host device may predict an upcoming traffic accident, based on the information collected by the one or more sensors, and the host device may immediately notify the memory device of the predicted upcoming traffic accident. The memory device may increase a data write speed using an internal firmware manipulation (e.g., a pause of the defragmentation operation, a pause of the refresh scan operation, and/or a pause of the SLC to TLC folding operation), which may enable the video data, which may provide critical information related to the traffic accident, to be successfully written to the memory (or written as much as possible) before a power outage that causes the memory device to cease operation. The increased data write speed may be implemented based on the predicted upcoming traffic event. After the power outage, any unwritten recently captured video data will not be written to the memory and will be lost, so the increased data write speed may allow as much video data as possible to be written to the memory before the power outage.

In some implementations, an ability to write the recently captured video data to the memory via the increased data write speed may ensure a recording data integrity and enhance a customer experience. The memory device may increase a vehicle DVR recording speed to save as much data as possible in anticipation of the traffic accident. Such an approach may reduce a memory design complexity (e.g., lower a requirement of a memory performance optimization, such as a firmware algorithm or a NAND performance tuning). Further, such an approach may not involve large capacitors for a power loss protection circuit design, nor fast-tuned management NAND chips associated with relatively high costs, thereby providing a more favorable solution.

Figure 1:
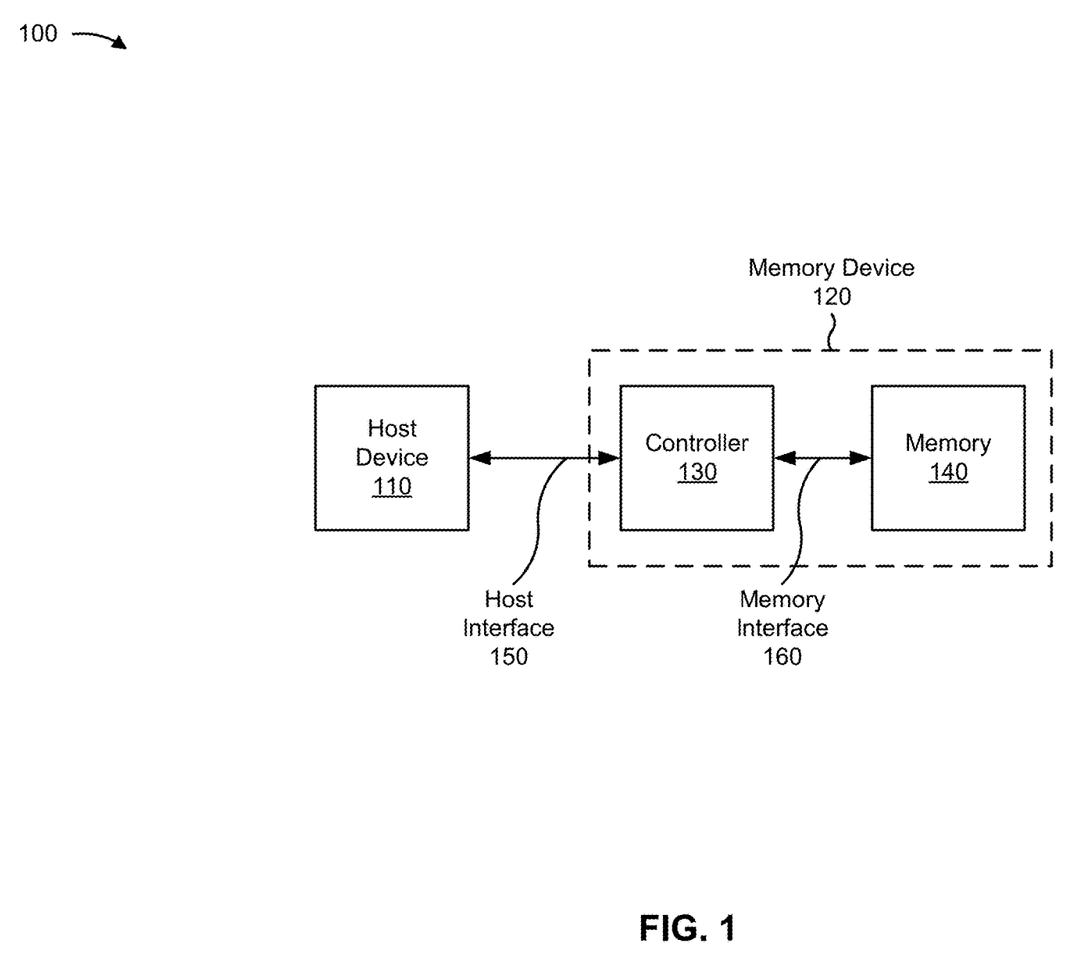
FIG. 1 is a diagram illustrating an example system capable of performing write operations at increased write speeds based on potential events.

FIG. 1 is a diagram illustrating an example system 100 capable of performing write operations at increased write speeds based on potential events. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as DRAM and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, one or more systems, devices, apparatuses, components, and/or controllers of FIG. 1 may be configured to receive, from the host device 110, a signal indicative of a potential event; pause, based on the signal, a background operation of the memory device 120; and perform a write operation to write data to the memory 140 while the background operation is paused, wherein a write speed associated with the write operation is an increased write speed, as compared to a default write speed, based on the background operation being paused during the write operation.

In some implementations, one or more systems, devices, apparatuses, components, and/or controllers of FIG. 1 may be configured to detect a potential event based on sensor information; transmit a signal indicative of the potential event; receive, from the host device 110, the signal indicative of the potential event; pause, based on the signal, a background operation of the memory device 120; and perform a write operation to write data to the memory 140 while the background operation is paused, wherein a write speed associated with the write operation is an increased write speed, as compared to a default write speed, based on the background operation being paused during the write operation.

As indicated above, FIG. 1 is provided as an example. Other examples may differ from what is described with regard to FIG. 1.

Figure 2:
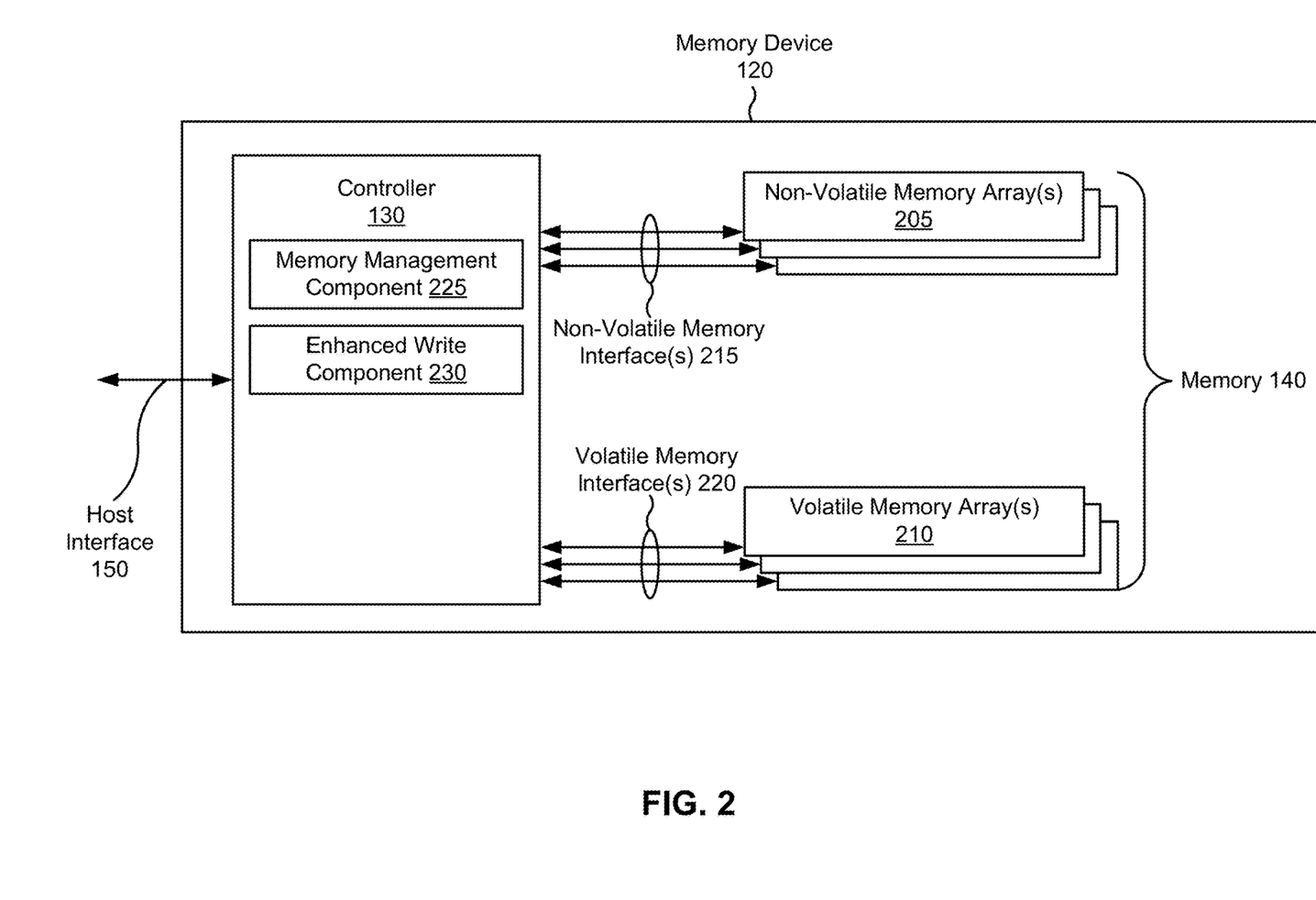
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, and/or an enhanced write component 230. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The enhanced write component 230 may be configured to receive, from the host device 110, a signal indicative of a potential event. The enhanced write component 230 may be configured to pause, based on the signal, a background operation of the memory device 120. The enhanced write component 230 may be configured to perform a write operation to write data to the memory 140 while the background operation is paused, wherein a write speed associated with the write operation is an increased write speed, as compared to a default write speed, based on the background operation being paused during the write operation.

One or more devices or components shown in FIG. 2 may be configured to perform operations described herein, such as one or more operations and/or methods described in connection with FIGS. 3-4. For example, the controller 130, the memory management component 225, and/or the enhanced write component 230 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
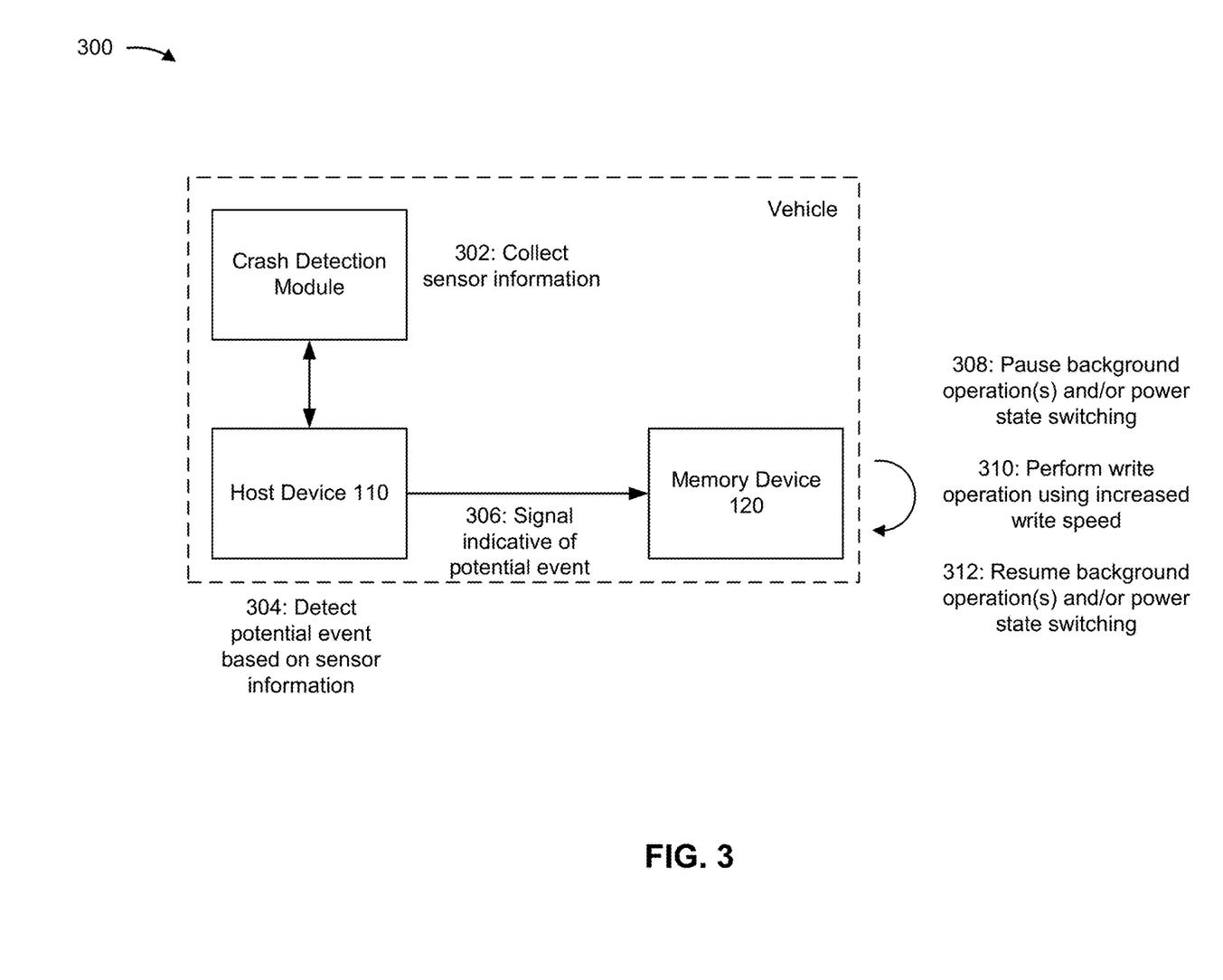
FIG. 3 is a diagram illustrating an example of performing write operations at increased write speeds based on potential events.

FIG. 3 is a diagram of an example 300 of performing write operations at increased write speeds based on potential events. The operations described in connection with FIG. 3 may be performed by the host device 110 and/or the memory device 120, and/or one or more components of the memory device 120, such as the controller 130 and/or one or more components of the controller 130. The host device 110 and the memory device 120 may be associated with a vehicle. For example, host device 110 and the memory device 120 may be onboard the vehicle. The memory device 120 may be a non-volatile memory (NVM), such as a memory card, an eMMC, a UFS, or an SSD.

In some aspects, a crash detection module, the host device 110, and the memory device 120 may be associated with a vehicle. For example, the crash detection module, the host device 110, and the memory device 120 may be onboard the vehicle.

In some implementations, the vehicle may include a camera sensor (or multiple camera sensors). The camera sensor may capture video data of a scene associated with the vehicle. For example, the camera sensor may capture a scene of a front view associated with the vehicle. In some cases, multiple camera sensors may capture video data of multiple scenes associated with the vehicle (e.g., scenes associated with multiple views). The camera sensor may provide the video data to the host device 110 for storage. The video data may be vital for evidence in case the vehicle is involved in an event, such as a traffic accident. For example, the video data may provide information regarding other parties or vehicles involved in the event. The video data may provide evidence regarding which party is at fault for causing the event to occur.

As shown by reference number 302, the crash detection module may collect sensor information. The crash detection module may include one or more sensors, such as an accelerometer, a gyroscope, motion sensors, proximity sensors, and/or radar sensors. The one or more sensors may be installed on an exterior of the vehicle. The sensor information may include accelerometer data, which may be based on the accelerometer. The accelerometer data may indicate an acceleration (or speed information) associated with the vehicle. The sensor information may include position information, which may be based on the gyroscope. The position information may indicate a position associated with the vehicle. The sensor information may include movement information, which may be based on the motion sensors. The movement information may indicate whether one or more objects around the vehicle are moving. The sensor information may include proximity information, which may be based on the proximity sensors. The proximity information may indicate whether one or more objects are located proximate to the vehicle. For example, the proximity information may indicate whether a particular object is within a certain distance from the vehicle. The proximity sensors may detect a presence of a nearby object. The sensor information may include radar information, which may be based on the radar sensors. The radar information may indicate a distance, an angle, and/or a velocity of each of one or more nearby objects, relative to the vehicle. In other words, the sensor information may include object movement information, which may indicate movements of the nearby objects. In some implementations, the sensor information may indicate objects that are relatively close to the vehicle, as well as a velocity and a direction of each of the objects, relative to the vehicle. Further, the crash detection module may provide the sensor information to the host device 110.

As shown by reference number 304, the host device 110 may detect a potential event based on the sensor information. The potential event may be a traffic accident involving the vehicle. The potential event may be an event that potentially causes a power loss to the memory device 120, which may prevent subsequent read-write operations for the memory device 120. The traffic accident may involve objects that are relatively close to the vehicle, as detected by the one or more sensors. The host device 110 may employ an artificial intelligence or machine learning (AI/ML) model associated with a potential event prediction. The host device 110 may provide the sensor information as an input to the AI/ML model. The AI/ML model may output a value, which may represent an event occurrence level (or event emergency level). The value may indicate a likelihood of the vehicle being involved in an event (e.g., the traffic accident) based on the sensor information. For example, when there are no other vehicles located relatively close to the vehicle, the value may be relatively low, which may indicate that the vehicle is not likely to be involved in the event. As another example, when another vehicle is speeding directly at the vehicle at a relatively high velocity, based on the sensor information, the value may be relatively high, which may indicate that the vehicle is likely to be involved in the event. In some implementations, the host device 110 may periodically calculate the value (e.g., every one second) based on the latest sensor information.

As shown by reference number 306, the memory device 120 may receive, from the host device 110, a signal, where the signal may be indicative of the potential event. The memory device 120 may receive the signal via a memory pin of the memory device 120. The memory pin may be a reserved for future use (RFU) pin. The host device 110 may signal the memory device 120 via the memory pin to indicate that the potential event may occur. Alternatively, the signal may be associated with a predefined vendor user command in compliance with a standard command set. The host device 110 may send the predefined vendor user command to the memory device 120, where the predefined vendor user command may indicate that the potential event may occur.

As shown by reference number 308, the memory device 120 may pause, based on the signal, one or more background operations of the memory device 120. A background operation of the memory device 120 may include a defragmentation. The defragmentation may involve a reorganization of data stored on the memory device 120 (or a reduction of fragmentation), which may improve a performance of the memory device 120. A background operation of the memory device 120 may include a refresh scan. The refresh scan may involve periodically reading information from the memory device 120 and rewriting that information to the memory device 120 without modification (e.g., for the purpose of preserving the information). A background operation of the memory device 120 may include an SLC to TLC folding. The SLC to TLC folding may involving combining separate SLC blocks into a single TLC block. In other words, when the memory device 120 receives the signal that indicates the potential event, the memory device 120 may pause the one or more background operations of the memory device 120. In some implementations, the memory device 120 may pause, based on the signal, a power state switching of the memory device 120. As a result, the memory device 120 may be prevented from switching between different power states (e.g., switching from a standby state to a non-standby state).

As shown by reference number 310, the memory device 120 may perform a write operation of the video data, as captured by the camera sensor, to a memory of the memory device 120. The memory device 120 may perform the write operation while the one or more background operations and/or the power state switching are paused. A write speed associated with the write operation may be an increased write speed, as compared to a default write speed, based on the one or more background operations and/or the power state switching being paused during the write operation. In other words, when the one or more background operations and/or the power state switching are not paused, the memory device 120 may perform write operations in accordance with the default write speed. However, when the one or more background operations and/or the power state switching are paused, the memory device 120 may have additional resources available to obtain the increased write speed, and thus may be able to perform the write operation of the video data using the increased write speed.

In some implementations, the memory device 120 may apply, based on the signal, a write optimization to obtain the increased write speed for the write operation. The write optimization may be associated with writing the video data to a trimmed memory cell of the memory device 120. The trimmed memory cell may have already been processed, such that blocks of data no longer in use in that memory cell have been erased, and thus may improve the write speed. In other words, the memory device 120 may be able to achieve the increased write speed when writing the video data to the trimmed memory cell. The write optimization may be associated with writing the video data using a pseudo SLC mode. The pseudo SLC mode may be associated with an increased write speed, as compared to a TLC mode. The memory device 120 may be able to achieve the increased write speed when writing the video data using the pseudo SLC mode.

In some implementations, the memory device 120 may achieve the increased write speed by pausing the one or more background operations and/or the power state switching, which may be based on the indication of the potential event. The potential event may be associated with an event that affects a power source of the memory device 120, and since an occurrence of the event may prevent recently captured video data from being successfully written to the memory, the memory device 120 may pause the one or more background operations and/or the power state switching to obtain the increased write speed. The increased write speed may allow a greater amount of video data to be written to the memory before the power loss, as compared to writing the video data using the default write speed. As a result, less video data is likely to be permanently lost in case the event causes the power loss to the memory device 120, since video data that is in the process of being written while the power is discontinued may be permanently lost. An ability to save more video data may improve an overall performance of the memory device 120.

As shown by reference number 312, the memory device 120 may resume the one or more background operations and/or the power state switching of the memory device 120. The memory device 120 may determine that a condition has been satisfied. For example, the memory device 120 may determine that the memory device 120 has remained powered on for a period of time after the signal is received. In this case, the memory device 120 may not have actually lost power due to the event. Alternatively, the potential event may have been a false alarm, and no event may have actually occurred. In these cases, the memory device 120 may resume the one or more background operations and/or the power state switching of the memory device 120. The memory device 120 may revert back to the default write speed when writing video data to the memory.

As indicated above, FIG. 3 is provided as an example. Other examples may differ from what is described with regard to FIG. 3.

Figure 4:
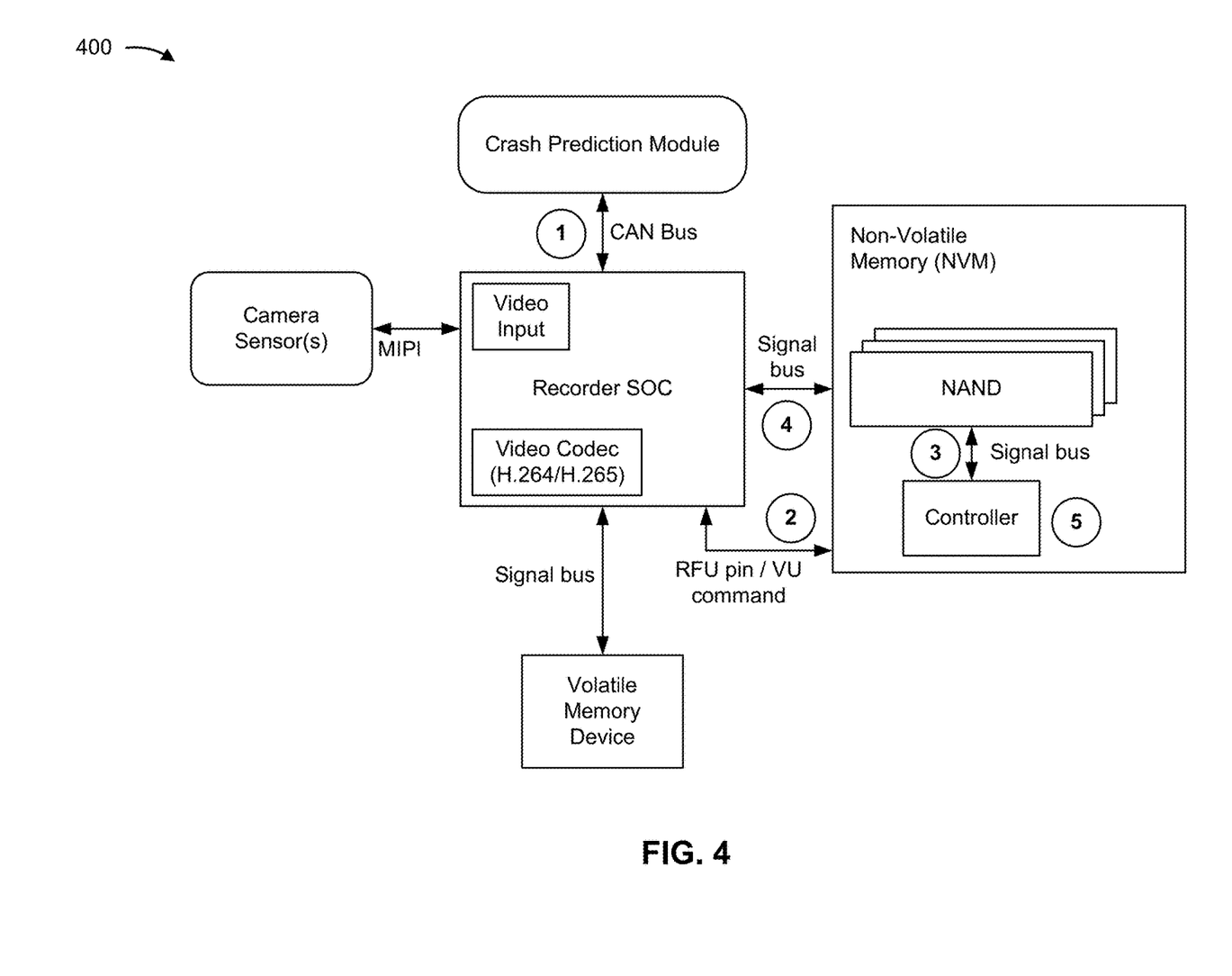
FIG. 4 is a diagram illustrating an example of a vehicle digital video recorder (DVR) system capable of performing write operations at increased write speeds based on potential events.

FIG. 4 is a diagram of an example 400 of a vehicle DVR system capable of performing write operations at increased write speeds based on potential events. The vehicle DVR system may be on-board a vehicle.

In some implementations, the vehicle DVR system may include a crash prediction module, a camera sensor (or multiple camera sensors), a recorder system-on-chip (SOC) (or host device), a volatile memory device (e.g., DRAM), and an NVM (or memory device). The crash prediction module may be associated with a traffic accident prediction and a notification trigger. The volatile memory device may be associated with a video image buffer. The NVM may be associated with a video data storage.

In some implementations, the camera sensor may capture video data. The video data may be associated with one or more views surrounding the vehicle. For example, the video data may be associated with a front view of the vehicle, a back video of the vehicle, and/or a side view of the vehicle. The video data may be provided as a video input to the recorder SOC. The camera sensor may provide the video data via a mobile industry processor interface (MIPI) interface. The video data may be associated with a video codec (e.g., H.264 or H.265). The video data may initially be stored in the volatile memory buffer before being moved to the NVM.

In a first step, the crash prediction module may detect a potential traffic accident according to monitored information (e.g., speed, position, and/or object movement). The crash prediction module may be associated with one or more sensors, such as a proximity sensor, a motion sensor, a camera sensor, or any other suitable sensor capable of predicting traffic accidents based on the movement of objects. The one or more sensors may be distributed across different areas of the vehicle. The crash prediction module may deploy an AI/ML model to predict the potential traffic accident, depending on the monitored information. The crash prediction module may notify the recorder SOC of the potential traffic accident, as long as an event emergency level satisfies a threshold. The event emergency level may be based on the monitored information. The crash prediction module may transmit the notification to the recorder SOC via a controller area network (CAN) bus.

In a second step, the recorder SOC may receive the notification from the crash prediction module. The recorder SOC may signal the NVM via a memory pin, such as an RFU pin, with a high priority, which may indicate the potential traffic accident to the NVM. The memory pin may be associated with a pre-aligned notification logic between the host SOC and the NVM. For example, a square wave with a certain quantity of pulses may be one feasible option. Alternatively, the recorder SOC may signal the NVM using a predefined vendor user command with a specific argument, where the predefined vendor user command may be in compliance with a Joint Electron Device Engineering Council (JEDEC) standard command set. In some implementations, the recorder may signal the memory pin or the predefined vendor user command based on the notification received from the crash prediction module.

In a third step, the NVM may receive a signal from the recorder SOC. The signal may be indicative of the potential traffic accident. The NVM (via an NVM firmware and a controller) may halt various background operations of the NVM, such as a defragmentation, a refresh scan, and/or an SLC to TLC folding, based on the signal received from the recorder SOC. The defragmentation may involve a reorganization of data stored on the NVM (or a reduction of fragmentation). The refresh scan may involve periodically reading information from the NVM and rewriting that information to the NVM without modification (e.g., for the purpose of preserving the information). The SLC to TLC folding may involving combining separate SLC blocks into a single TLC block. Such background operations may consume read-write resources of the NVM. The NVM may halt a power state switching based on the signal received from the recorder SOC. The power state switching may otherwise cause the NVM to resume from a standby mode, which may take additional time. By halting the background operations and/or halting the power state switching, the NVM (via the firmware) may prioritize write operations on NAND components. Further, to increase a write performance, write operations may be schemed to use quick-placement techniques, such as trimmed NAND cells (which may compromise NAND data retention) or a pseudo SLC mode. The trimmed NAND cells may have already been processed, such that blocks of data no longer in use have been erased, and thus may improve the write performance. By employing the NAND cells, the write operations may not involve erasing existing information, which may improve the write performance. Further, the pseudo SLC mode may be associated with an increased write speed, as compared to a TLC mode.

In a fourth step, when such write performance optimizations are applied (e.g., halting the background operations and halting the power state switching), the recorder SOC may move the video data from the volatile memory device to the NVM at an increased write speed, as compared to when such performance optimizations are not applied. Typically, the NVM may operate in a "dirty" state and may consume resources for the background operations, but when such resources are freed based on receiving the signal associated with the potential traffic accident, the NVM may be able to increase the write speed when writing the video data. As a result, the NVM may be more likely to save critical video data associated with a traffic accident associated with the vehicle. The traffic accident may cause a loss of power to the NVM, and the loss of power may cause video data in the volatile memory buffer to not be transferred to the NVM and be permanently lost. By increasing the write speed, the video data is more likely to be saved by the NVM, and thus may be later accessed even with the loss of power.

In a fifth step, the NVM may autonomously determine to resume a normal operation. For example, the NVM may resume the background operations, and the NVM may resume the power state switching. The NVM may determine to resume the normal operation when the NVM is powered on for a certain period of time, after the signal is received from the recorder SOC. The NVM being powered on for the certain period of time may indicate that the traffic accident did not occur, or that the traffic accident was not severe enough to cause the loss of power. In other words, the traffic accident may not be severe enough to damage a power system, so the NVM may resume the normal operation (with the lower write speed). Meanwhile, the NVM may copy video data programmed with quick-placement techniques to other regions to acquire better data retention.

As indicated above, FIG. 4 is provided as an example. Other examples may differ from what is described with regard to FIG. 4.

Figure 5:
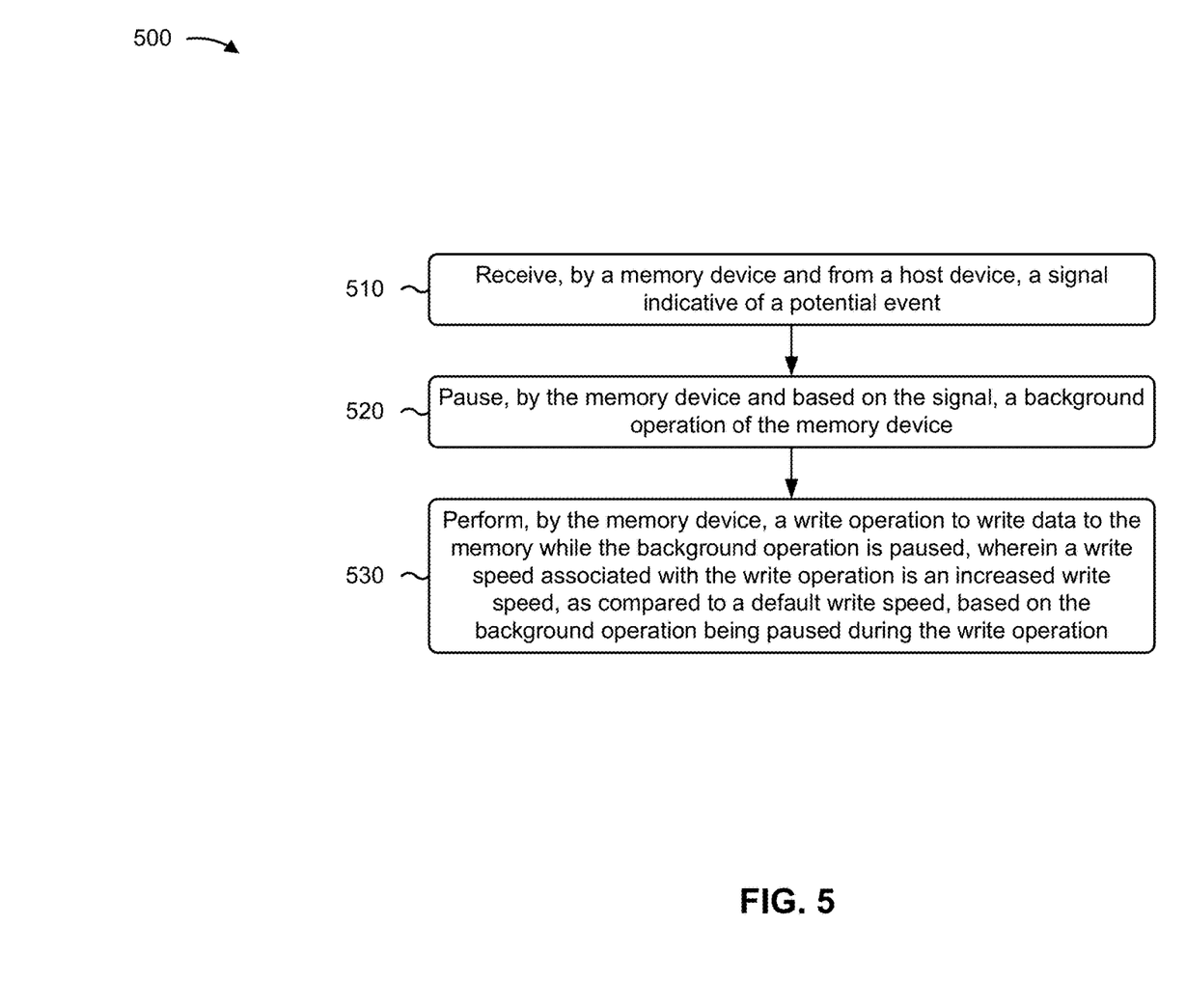
FIG. 5 is a flowchart of an example method associated with performing write operations at increased write speeds based on potential events.

FIG. 5 is a flowchart of an example method 500 associated with performing write operations at increased write speeds based on potential events. In some implementations, a memory device (e.g., the memory device 120) may perform or may be configured to perform the method 500. In some implementations, another device or a group of devices separate from or including the memory device (e.g., the host device 110) may perform or may be configured to perform the method 500. Additionally, or alternatively, one or more components of the memory device (e.g., the controller 130, the memory management component 225, and/or the enhanced write component 230) may perform or may be configured to perform the method 500. Thus, means for performing the method 500 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 500.

As shown in FIG. 5, the method 500 may include receiving, from a host device, a signal indicative of a potential event (block 510). As further shown in FIG. 5, the method 500 may include pausing, based on the signal, a background operation of the memory device (block 520). As further shown in FIG. 5, the method 500 may include performing a write operation to write data to a memory while the background operation is paused, wherein a write speed associated with the write operation is an increased write speed, as compared to a default write speed, based on the background operation being paused during the write operation (block 530).

The method 500 may include additional aspects, such as any single aspect or any combination of aspects described below and/or described in connection with one or more other methods or operations described elsewhere herein.

In a first aspect, the data written to the memory is video data obtained from one or more camera sensors.

In a second aspect, alone or in combination with the first aspect, the signal is received via a memory pin of the memory device.

In a third aspect, alone or in combination with the second aspect, the signal is associated with a predefined vendor user command in compliance with a standard command set.

In a fourth aspect, alone or in combination with the third aspect, the potential event is a traffic accident involving a vehicle associated with the memory device, wherein the potential event is based on information associated with one or more of the memory device or the vehicle, and wherein the information includes one or more of speed information, position information, or object movement information.

In a fifth aspect, alone or in combination with the fourth aspect, the background operation is one or more of: a defragmentation operation, a refresh scan operation, or an SLC to TLC folding operation.

In a sixth aspect, alone or in combination with the fifth aspect, the method 500 includes pausing, based on the signal, a power state switching of the memory device.

In a seventh aspect, alone or in combination with the sixth aspect, the method 500 includes determining that a condition has been satisfied, wherein the condition is satisfied based on the memory device being powered on for a period of time after the signal is received, and resuming the background operation of the memory device.

In an eighth aspect, alone or in combination with one or more of the first and seventh aspects, the method 500 includes applying, based on the signal, a write optimization to obtain the increased write speed for the write operation, wherein the write optimization is associated with writing the data to a trimmed memory cell of the memory device or writing the data using a pseudo SLC mode.

In a ninth aspect, alone or in combination with one or more of the first and eighth aspects, the memory device is associated with a vehicle.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

In some implementations, a memory device includes memory; and a controller configured to: receive, from a host device, a signal indicative of a potential event; pause, based on the signal, a background operation of the memory device; and perform a write operation to write data to the memory while the background operation is paused, wherein a write speed associated with the write operation is an increased write speed, as compared to a default write speed, based on the background operation being paused during the write operation.

In some implementations, a method includes receiving, by a memory device and from a host device, a signal indicative of a potential event; pausing, by the memory device and based on the signal, a background operation of the memory device; and performing, by the memory device, a write operation to write data to the memory while the background operation is paused, wherein a write speed associated with the write operation is an increased write speed, as compared to a default write speed, based on the background operation being paused during the write operation.

In some implementations, a system includes a host device configured to: detect a potential event based on sensor information; and transmit a signal indicative of the potential event; and a memory device configured to: receive, from the host device, the signal indicative of the potential event; stop, based on the signal, a background operation of the memory device; and perform a write operation to write data to the memory while the background operation is stopped, wherein a write speed associated with the write operation is an increased write speed, as compared to a default write speed, based on the background operation being stopped during the write operation.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   memory; and
   a controller configured to:
      receive, from a host device, a signal indicative of a potential event;
      pause, based on the signal, a background operation of the memory device;
      perform a write operation to write data to the memory while the background operation is paused, wherein a write speed associated with the write operation is an increased write speed, as compared to a default write speed, based on the background operation being paused during the write operation;
      determine that the memory device has remained powered on for a certain period of time after the signal is received; and
      resume the background operation based on determining that the memory device has remained powered on for the certain period of time.

2. The memory device of claim 1, wherein the data written to the memory is video data obtained from one or more camera sensors.

3. The memory device of claim 1, wherein the signal is received via a memory pin of the memory device.

4. The memory device of claim 1, wherein the signal is associated with a predefined vendor user command in compliance with a standard command set.

5. The memory device of claim 1, wherein the potential event is a traffic accident involving a vehicle associated with the memory device, wherein the potential event is based on information associated with one or more of the memory device or the vehicle, and wherein the information includes one or more of speed information, position information, or object movement information.

6. The memory device of claim 1, wherein the background operation is one or more of: a defragmentation operation, a refresh scan operation, or a single-level cell (SLC) to triple-level cell (TLC) folding operation.

7. The memory device of claim 1, wherein the controller is configured to pause, based on the signal, a power state switching of the memory device.

8. The memory device of claim 1, wherein the controller is configured to:
   determine that a condition has been satisfied; and
   resume the background operation of the memory device.

9. The memory device of claim 1, wherein the controller is configured to:
   apply, based on the signal, a write optimization to obtain the increased write speed for the write operation, wherein the write optimization is associated with writing the data to a trimmed memory cell of the memory device or writing the data using a pseudo single-level cell (SLC) mode.

10. The memory device of claim 1, wherein the memory device is associated with a vehicle.

11. A method, comprising:
    receiving, by a memory device and from a host device, a signal indicative of a potential event;
    pausing, by the memory device and based on the signal, a background operation of the memory device;
    performing, by the memory device, a write operation to write data to the memory device while the background operation is paused, wherein a write speed associated with the write operation is an increased write speed, as compared to a default write speed, based on the background operation being paused during the write operation;
    determining that the memory device has remained powered on for a certain period of time after the signal is received; and
    resuming the background operation based on determining that the memory device has remained powered on for the certain period of time.

12. The method of claim 11, further comprising:
    pausing, based on the signal, a power state switching of the memory device.

13. The method of claim 11, further comprising:
    applying, based on the signal, a write optimization to obtain the increased write speed for the write operation, wherein the write optimization is associated with writing the data to a trimmed memory cell of the memory device or writing the data using a pseudo single-level cell (SLC) mode.

14. A system, comprising:
    a host device configured to:
       detect a potential event based on sensor information; and
       transmit a signal indicative of the potential event; and
    a memory device configured to:
       receive, from the host device, the signal indicative of the potential event;
       stop, based on the signal, a background operation of the memory device; and
       perform a write operation to write data to the memory device while the background operation is stopped, wherein a write speed associated with the write operation is an increased write speed, as compared to a default write speed, based on the background operation being stopped during the write operation;

determine that the memory device has remained powered on for a certain period of time after the signal is received; and resume the background operation based on determining that the memory device has remained powered on for the certain period of time.

15. The system of claim 14, wherein:

the signal is received via a memory pin of the memory device; or the signal is associated with a predefined vendor user command in compliance with a standard command set.

16. The system of claim 14, wherein the background operation is one or more of: a defragmentation operation, a refresh scan operation, or a single-level cell (SLC) to triple-level cell (TLC) folding operation.

17. The system of claim 14, wherein the memory device is configured to:

apply, based on the signal, a write optimization to obtain the increased write speed for the write operation, wherein the write optimization is associated with writing the data to a trimmed memory cell of the memory device or writing the data using a pseudo single-level cell (SLC) mode.

18. The system of claim 14, wherein the data written to the memory device is video data obtained from one or more camera sensors.

19. The system of claim 14, wherein the potential event is a traffic accident involving a vehicle associated with the memory device, wherein the potential event is based on information associated with one or more of the memory device or the vehicle, and wherein the information includes one or more of speed information, position information, or object movement information.

20. The system of claim 14, wherein the memory device is configured to pause, based on the signal, a power state switching of the memory device.

* * * * *